Aug. 8, 1967     G. P. HUPPKE     3,334,470
METHOD AND APPARATUS FOR COLLECTING CONTAMINANTS FROM GASES
Filed Nov. 10, 1965     2 Sheets-Sheet 1

INVENTOR
GLEN P. HUPPKE
BY Mason, Kolehmainen, Rathburn & Wyss.
ATTORNEYS

Aug. 8, 1967　　　　G. P. HUPPKE　　　3,334,470
METHOD AND APPARATUS FOR COLLECTING CONTAMINANTS FROM GASES
Filed Nov. 10, 1965　　　　　　　　　　　2 Sheets-Sheet 2
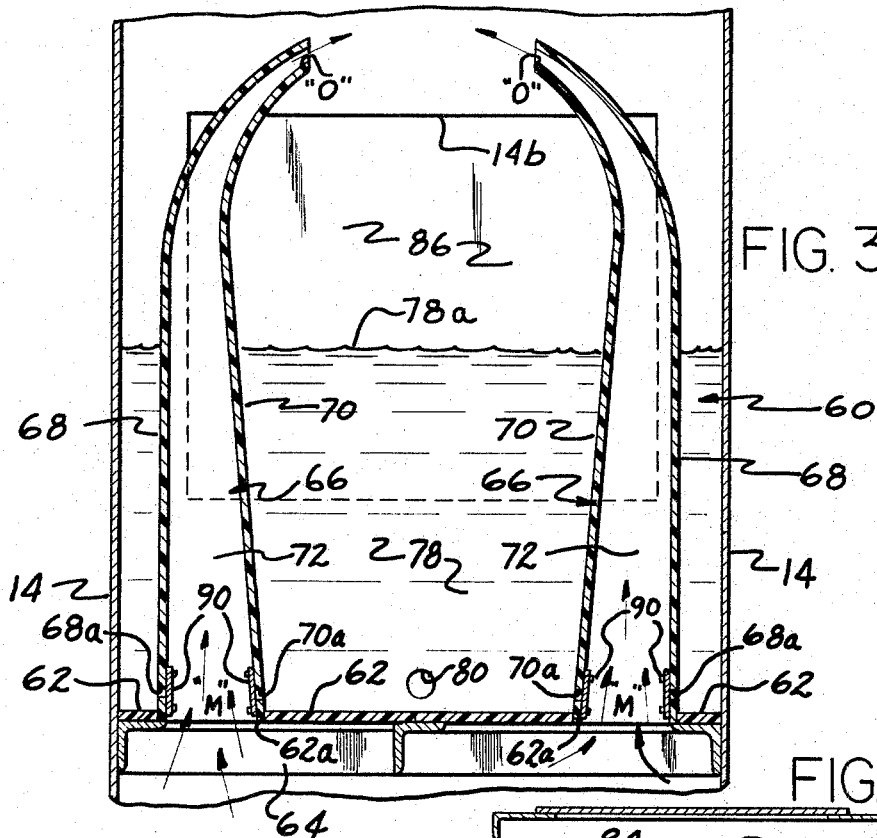
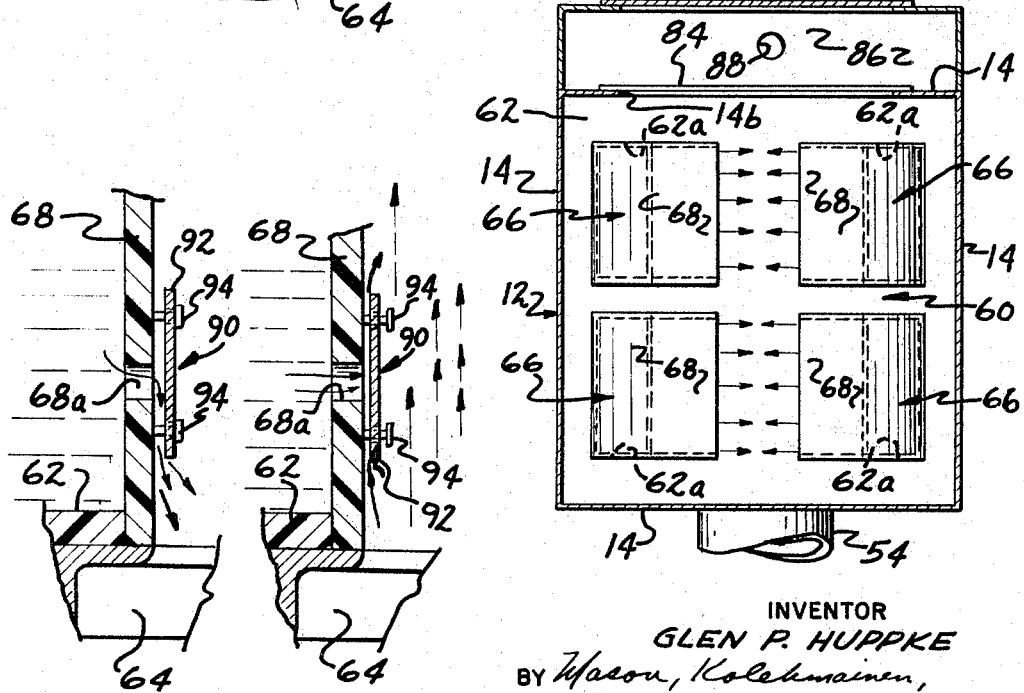
INVENTOR
GLEN P. HUPPKE
BY Mason, Kolehmainen,
Rathburn & Wyss
ATTORNEYS

United States Patent Office 3,334,470
Patented Aug. 8, 1967

3,334,470
METHOD AND APPARATUS FOR COLLECTING CONTAMINANTS FROM GASES
Glen P. Huppke, Beaver Falls, N.Y., assignor to National Dust Collector Corporation, Skokie, Ill., a corporation of Illinois
Filed Nov. 10, 1965, Ser. No. 507,154
8 Claims. (Cl. 55—90)

The present invention relates to a new method and apparatus for collecting contaminants from gases and, more particularly, relates to a new and improved method and apparatus for removing solid contaminants, such as dust particles and the like, from gases, such as air and flue gases and the like.

Many types of industrial gas cleaning devices are presently available for removing contaminants, such as small dust particles, from a gas stream. Some of these devices are classed as inertial-type cleaners because inertial forces acting on the particles are utilized to physically separate the particles from the gas stream in which they are suspended and carried. Other types of gas cleaners operate with a liquid cleaning medium which entraps the contaminants within the medium by diffusion and impingement of the contaminant particles on wetted films of the liquid medium. The present invention relates generally to the latter type of gas cleaning devices and provides a new and unique method of removing the contaminants from a gaseous medium in a highly efficient manner.

It is therefore an object of the present invention to provide a new and improved method of removing contaminants from a gaseous medium.

Similarly, it is an object of the present invention to provide a new and improved apparatus for removing contaminants from a gaseous medium.

More specifically, it is an object of the present invention to provide a new and improved method of removing contaminants from a gaseous medium wherein the gas is formed into one or more high velocity jets or streams and a contaminant collecting liquid medium is introduced by venturi action into the streams or jets to collect and entrap the contaminants or dust particles.

Another object of the present invention is the provision of a new and improved method of removing contaminants from a gaseous medium as described in the foregoing object, wherein the liquid medium is introduced into the gas stream and the stream containing the liquid medium is then accelerated to a maximum velocity and discharged into an open space wherein the contaminated liquid medium is separated from the gas and collected.

Still another object of the invention is to provide a new and improved method of removing contaminants from a gaseous medium wherein two high velocity jets or streams of gas are directed on crossing, convergent paths so that contaminant particles and liquid droplets or particles in one stream collide with those in an opposite directly converging stream.

Yet another object of the present invention is the provision of a new and improved method of removing contaminants from a gaseous medium wherein the gas is formed into one or more high velocity streams and a contaminant collecting liquid medium is introduced into the streams or jets in a manner whereby large envelopes of intensely mixed liquid and gas particles are formed which surround and envelop the gas streams.

Still another object of the present invention is the provision of a new and improved method of removing contaminants from a gaseous medium as described in the preceding object, wherein the liquid gaseous envelopes around two opposing intersecting gas streams impinge directly upon one another.

Another object of the present invention is the provision of a new and improved apparatus for removing contaminants from a gaseous medium including nozzle means for directing the gas into one or more high velocity streams and means for entraining contaminant containing liquid medium into the streams at the inlet or mouth of the nozzles by venturi action to provide intense mixing between the gas and liquid to entrap and collect the contaminants in the liquid medium.

Another object of the invention is the provision of new and improved apparatus of the type described wherein the liquid medium is supplied from a liquid bath and is entrained within the streams by venturi action adjacent the inlet or mouth of the nozzle means.

Another object of the invention is the provision of a new and improved apparatus as described in the foregoing object including valve means for controlling the introduction of the liquid medium into the nozzle gas stream.

Yet another object of the present invention is the provision of a new and improved apparatus for removing contaminants from a gaseous medium.

Still another object of the present invention is the provision of a new and improved apparatus for removing contaminants from a gaseous medium wherein a pair of nozzle means are provided for directing the gas in high velocity streams and the nozzle are directed on converging paths whereby the liquid and gas in each stream collide with a converging stream above the liquid bath, and the contaminated liquid is collected in the bath.

The foregoing and other objects and advantages of the present invention are accomplished by the provision of a new and improved method of collecting contaminants from a gaseous medium comprising the steps of directing the gas into high velocity streams and introducing a contaminant collecting liquid medium into the gas flow by venturi action and thereby developing an intimate mixture of finely divided liquid droplets and gas whereby the contaminants in the gas are entrapped and collected in the liquid medium. The gas and liquid mixture in the streams is directed into a region of reduced pressure and expands with the contaminated liquid medium settling out of the gas and carrying away the contaminants. The streams are directed to intersect one another in the region of reduced pressure and the direct collision of the streams aids in mixing and separating out the contaminated liquid collecting medium.

In one embodiment, apparatus of the present invention comprises a housing defining a flow path for the gas and having a lower inlet and an upper outlet. A pair of nozzle structures are provided within the housing between the inlet and outlet to form high velocity gas streams directed to discharge toward each other in an expansion area of reduced pressure. Liquid medium for collecting the contaminants in the gas is supplied from a liquid bath located in the housing and surrounding the nozzle structure. Liquid from the bath is entrained into the gas streams flowing in the nozzles by venturi action. The liquid enters the gas streams adjacent the lower mouth or inlet of the nozzles and is intimately mixed with the gas to flow upwardly, reaching a maximum velocity at the nozzle outlets. As the gaseous liquid streams from the nozzle outlets enter the expansion area, the velocity thereof rapidly decreases and the contaminated liquid medium separates from the gas and falls into the liquid bath. This liquid is carried away out of the housing and the cleansed gas flows on upwardly and out through the housing outlet.

For a better understanding of the present invention, reference should be had to the following detailed description taken in conjunction with the drawings, in which:

FIG. 3 is an enlarged detailed sectional view of the nozzle assembly of the collector of FIG. 1;

FIG. 4 is a horizontal sectional view illustrating the nozzle assembly of the collector taken substantially along line 4—4 of FIG. 2; and FIG. 5 is a greatly enlarged detailed sectional view illustrating the liquid ports and valve construction of the nozzle assembly of FIG. 3; and FIG. 5a is similar to FIG. 5 but illustrating the valve member in another operative position.

Figure 1:
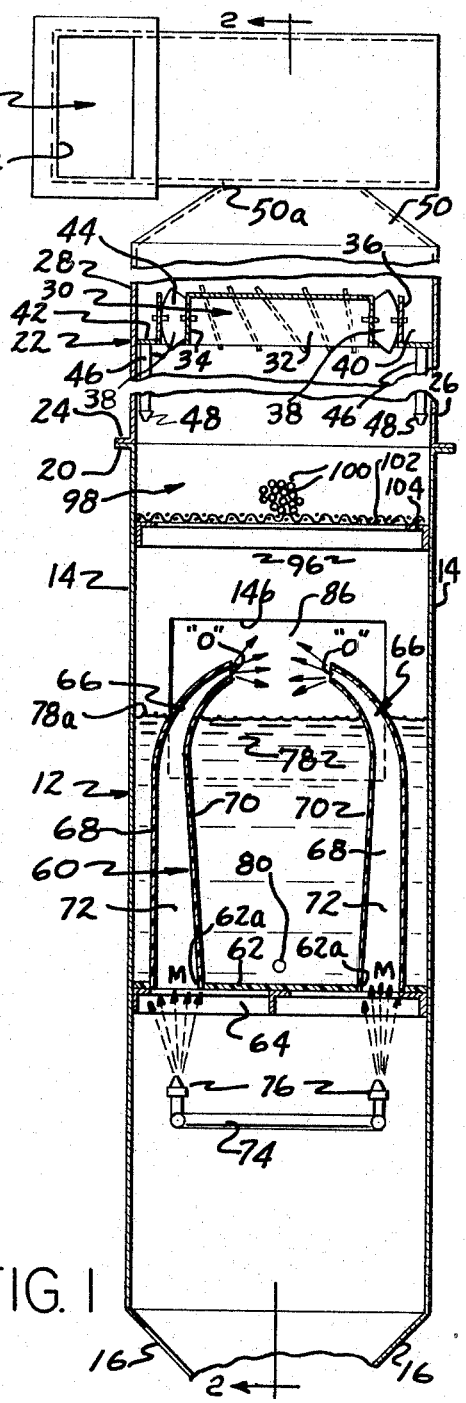
FIG. 1 is a vertical cross sectional view of one embodiment of a new and improved apparatus for collecting contaminants from gas, constructed in accordance with the present invention.

Referring now, more specifically, to the drawings, therein is illustrated in FIG. 1 a dust collector for removing contaminants from gas constructed in accordance with the present invention and referred to generally by the reference numeral 10. The dust collector 10 includes a main lower housing 12 of rectangular cross section having upstanding sidewalls 14 and inwardly sloping lower sidewalls 16 which converge toward a drain outlet 18 at the lower end of the housing. The lower end of the housing 12 functions as a sump or basin to collect the contaminated liquid in the housing and the sump is continually drained of liquid through the outlet 18.

The main lower housing 12 is provided with an outwardly extending peripheral flange 20 formed at the upper end of the sidewalls 14 to support an upper housing section 22 which is bolted thereto. The upper housing 22 includes a flanged lower end 24 resting upon the flange 20 and a lower transition section 26 which is rectangular or square in cross section at its lower end (flanged end 24) and changes in cross section to become round at its upper end. The upper, round end of the housing section 26 is joined to the lower end of an intermediate cylindrical section 28 which houses and contains an entrainment separator 30 for separating the liquid particles or liquid mist from the gas flowing upwardly through the collector.

Preferably, the entrainment separator 30 is of the type disclosed in copending U.S. patent application Ser. No. 309,789 filed Sept. 18, 1963, which application is assigned to the same assignee as the present invention. Briefly, the separator 30 includes a circular central bottom lower wall 32 joined around its periphery with an upstanding cylindrical inner ring 34. The inner ring 34 is spaced inwardly of an upstanding outer cylindrical ring 36 defining an annular air passage 38 between the two rings. The outer ring 36 is spaced inwardly of the wall of the cylindrical housing section 28 forming a liquid collecting trough or channel 40 having an annular bottom wall 42. A plurality of adjustable fins or vanes 44 are mounted in the annular air passage 38 and these vanes cause the upwardly moving gas in the collector housing to swirl and sling the liquid particles contained therein outwardly against the inner wall surface of the section 28. The liquid particles collect on the wall and flow downwardly into the trough or channel 42 and are drained back into the lower housing 12 through several drain tubes 46 having drain socks 48 on their lower end.

Above the entrainment separator 30, the upper housing 22 includes a frusto-conical top section 50 having its lower end joined to the upper end of the cylindrical intermediate section 28 and a central outlet opening 50a at the upper end thereof. A centrifugal fan 52 is mounted on the top section 50 to pull the gases upwardly through the collector. The fan includes an inlet coextensive with the outlet 50a of the collector housing and is provided with an outlet 52a for connection with a suitable distribution duct system.

Contaminated gas to be cleaned is introduced into the lower portion of the collector through an inlet fitting 54 extending angularly upward from an opening 14a in one of the sidewalls of the lower housing 12. The inlet fitting 54 is provided with a flange 54a at its outer end to facilitate connection with an inlet duct 56 which supplies contaminated gas to the collector. The central axis of the inlet fitting slopes downwardly into the collector housing and the contaminated gas entering the housing through the fitting reverses direction to flow upwardly through the housing, as indicated by the arrows in FIG. 1. The abrupt reversal in direction of flow of the incoming gases causes some of the heavier contaminant particles contained therein to separate out by gravity and fall to the bottom of the housing for removal through the drain 18. The contaminated gas entering the lower end of the housing 12 flows generally upward through the collector into the upper housing section 22 and is exhausted through the outlet 50a by the fan 52. During this upward movement in the collector many of the heavier contaminant particles gravitate out of the gas stream and eventually are collected in the lower end of the housing 12 and removed through the drain 18. The major problem encountered in most dust collecting devices is separating out the smaller impurities from the contaminated gas because the smaller particles are light enough and small enough to be carried upwardly against the force of gravity by the buoyant force of the gas stream.

In order to remove the smaller and lighter contaminant particles from the gas, the collector 10 includes a wet scrubber, assembly 60 positioned in the lower housing 12 above the inlet fitting 54. The assembly 60 includes a base or bottom wall 62 which extends transversely across the housing and is supported on a tray or frame 64 constructed of angles and fastened to the walls 14. The bottom wall 62 is provided with a plurality of rectangular openings or slots 62a arranged in pairs and symmetrical with respect to a central, vertical axis of the housing, as best illustrated in FIG. 4. Each slot 62a forms a mouth or inlet for seating the lower end of an upstanding nozzle structure 66.

Each nozzle structure 66 includes an outer wall 68, an inner wall 70, and a pair of sidewalls 72. The nozzles are rectangular in cross section with the sidewalls 72 in vertical, spaced, parallel relationship. The outer wall 68 and inner wall 70 of each nozzle gradually converge toward one another, moving upwardly from the lower end or inlet mouth M of the nozzle to a minimum spacing adjacent the upper or outlet end O. The upper portions of the walls 68 and 70 are curved, as shown in FIGS. 1 and 3, and each nozzle structure 66 is positioned so that the outlet O thereof faces inwardly toward the center of the collector housing 12.

Because the cross sectional area of each nozzle structure gradually reduces from the inlet M to a minimum at the outlet O, the gas flowing upwardly through the nozzle is smoothly accelerated to a maximum at the outlet tip of the structure. As viewed in FIG. 2, the outlets O take the form of narrow slots. The slot of each nozzle is directly opposite and facing a similar slot in an opposite nozzle structure as shown in FIGS. 1 and 3, so that the high velocity gas streams or jets flowing from opposing nozzles converge or intersect in a region midway between the nozzles, and intense turbulence and mixing action takes place.

A contaminant collecting liquid medium, such as water, is first introduced into the gas flowing upwardly through the nozzle structures 66 by means of a water supply manifold 74 positioned in the lower end of the housing beneath the bottom wall 62. The manifold includes several spray nozzles 76 and, preferably, a nozzle is positioned below each mouth or slot 62a to direct an upward spray of finely divided liquid particles or liquid mist into the inlet mouth M of a respective nozzle structure 66.

In addition to the liquid medium supplied from the spray nozzles 76, contaminant collecting liquid medium is supplied to the interior of the nozzle structure adjacent their inlets or mouths M through a plurality of ports 68a and 70a formed in the outer and inner walls thereof. As viewed in FIG. 2, the ports are arranged in horizontal rows slightly above the bottom wall 62 and liquid medium exteriorly of the nozzle structures 66 flows into the nozzles through the ports 68a and 70a and mixes with the upwardly moving gas streams therein. Each nozzle structure 66 extends upwardly from the bottom wall 62 and is surrounded on all sides by a liquid bath 78 maintained in the housing above the bottom wall. The liquid bath 78 is maintained with a selectively adjustable upper level 78a somewhat below the outlets O of the nozzles.

Figure 2:
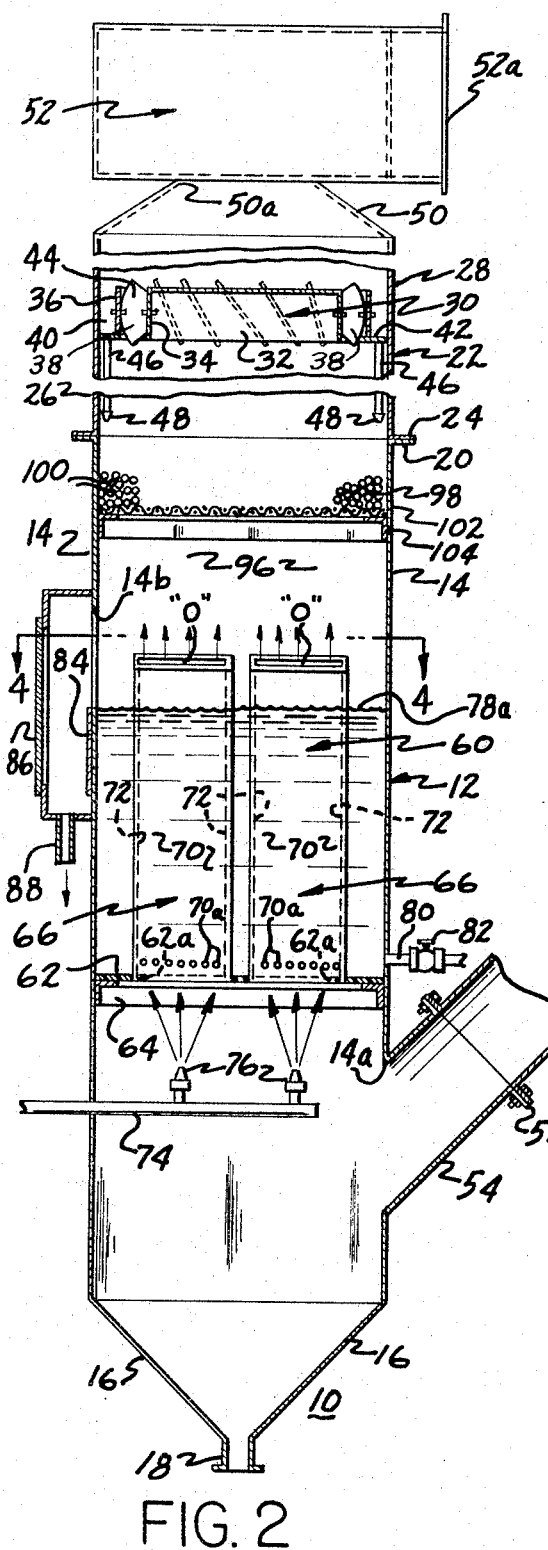
FIG. 2 is a vertical sectional view of the collector of FIG. 1 taken substantially along line 2—2 of FIG. 1.

Fresh water for the liquid bath 78 is supplied from an inlet line 80 having a control valve 82 to regulate the flow rate. The upper level 78a of the liquid bath is controlled by a large drain opening 14b formed in one of the sidewalls 14 of the housing and a movable gate 84 (FIG. 2). The gate 84 can be raised or lowered as desired to regulate the upper level 78a or depth of the liquid bath above the bottom wall 62. Water flowing over the gate 84 passes into a collection chamber 86 and is directed to a sewer line or into the lower end of the housing 12 through a drain line 88. Fresh water enters the liquid bath 78 through the inlet line 80 and flows through the ports 68a and 70a in the nozzle structures 66 to intimately mix with the contaminated gas entering the mouth of the nozzles.

In order to regulate the flow of water from the liquid bath 78 into the nozzles 66, each row of ports in the nozzle walls is provided with a movable check valve assembly 90 which comprises a horizontal strip 92 of flexible material adapted to cover the row of ports. Each valve strip 92 is supported by a plurality of headed pins 94 which extend outwardly from the nozzle walls toward the center of the nozzle and project through suitable apertures or slots formed in the valve strip. Referring to FIG. 5, when there is no gas flow in the nozzle structure 66, the valve strip 92 is moved away from the port 68a by water pressure in the liquid bath 78 and the liquid in the bath drains into the nozzle and down into the lower end of the housing. When the lower portion of the housing 12 is pressurized and gas is flowing upwardly through the nozzles 66, the valve strips 92 are forced inwardly toward the nozzle wall. This action prevents the water from merely draining through the ports into the lower end of the collector housing. The water flowing through the ports 68a and 70a is entrained into the upwardly moving gas stream by venturi action and is thoroughly and intimately mixed with gas.

By regulating the height of the liquid level 78a above the bottom wall 62, the proper amount of water entrainment into the nozzle 66 through the ports 68a and 70a can be achieved. As an example, when a relatively high volume flow rate of gas is supplied to the collector, a higher liquid head is needed in the liquid bath 78 and, accordingly, the adjustable overflow gate 84 is raised. On lower volume flow rates the gate 84 is lowered so that the relation between the liquid head in the bath 78 and gas pressure in the nozzles 66 is relatively constant.

As the contaminated gas moves upwardly in the nozzle structures 66, its velocity increases and its pressure decreases. The liquid medium introduced into the gas stream through the ports 68a and 70a and from the nozzles 76 is thoroughly and intimately mixed with the accelerating gas and the contaminant particles in the gas are wetted and collect within the liquid droplets. The liquid entering the gas stream through the ports is finely atomized by the venturi action and, accordingly, is extremely efficient in collecting contaminants having small particle size. In addition, the interior walls of the nozzle structures 66 are wetted with the liquid medium and contaminant particles in the gas stream impinge on the wetted surfaces and are collected in the liquid film. In order to collect dust and other impurities having particle sizes in the order of 10 microns or less, it is desirable that the liquid collecting medium be broken down into droplets or mist particles of the approximate same size. In other words, liquid particles approaching the size of the contaminant particles to be collected are more efficient in collecting the contaminants than larger droplets of liquid many times larger than the contaminant particles. The arrangement of the nozzles 66 wherein the liquid medium is introduced at the mouth or wide portion of the nozzle structure by venturi action and the liquid-gaseous stream is then accelerated to reach maximum velocity at the nozzle outlet O provides for a fine division of the liquid medium and mixing of the liquid and gas to effect most efficient contaminant collection.

The outlets O of the nozzle structures 66 are well above the upper level 78a of the liquid bath, and the high velocity gaseous-liquid jets from opposing nozzle outlets directly impinge or collide above the surface of the liquid bath. The region immediately above the liquid bath in the upper portion of the housing 12 comprises an expansion chamber 96 having a relatively low pressure. Within the expansion chamber, the gas velocity is greatly reduced from the maximum attained at the nozzle outlets O. As the gas velocity reduces, the liquid droplets containing contaminants drop into the liquid bath leaving the gas relatively free of contaminants to move upwardly in the housing. Much of the contaminant-laden liquid is carried out of the housing over the gate 84, while some may settle toward the bottom of the liquid bath 78 and eventually find its way to the sump in the lower end of the housing.

Because the interior surfaces of the nozzles 66 are wetted with the liquid medium, gaseous-liquid envelopes are formed around the jets discharging from the nozzle outlets O. These envelopes further increase the contact area between the liquid particles or film and the contaminant particles in the gas streams. The envelopes are directed to slope slightly upward from the horizontal plane and envelopes from opposing nozzles directly collide with one another midway between the nozzles. The direct collision of opposing envelopes and gas streams causes the envelopes to break up and an intense mixing action to develop in the region between the nozzles. As the envelopes break up, liquid droplets are formed and the contaminants are entrapped within these droplets and settle downwardly in the liquid bath.

In order to further clean the gas and remove any remaining liquid droplets and contaminants, a filter bed 98 is mounted in the upper end of the housing 12 above the expansion chamber 96. The filter bed 98 is generally similar in construction and operation to that shown, for example, in U.S. Patent No. 2,649,924. Generally, the filter bed 98 comprises a supporting frame 104 constructed of angles and secured to the sidewalls 14 of the housing. A screen or mesh 102 is supported by the frame 104 and a plurality of spherical filter balls 100 of stone or glass are placed on the screen in several layers. The gases flowing upwardly into the filter bed 98 from the expansion chamber 96 may still contain some liquid droplets, and these droplets collect and wet the surfaces of the spherical filter elements 100. The liquid film formed on the filter elements further aid in collecting contaminant particles which impinge thereon as the gas moves upwardly through the many devious and tortuous paths between the filter elements. When the liquid collected on the surface of the filter element reaches sufficient quantity, droplets are formed and these droplets eventually become large and heavy enough to gravitate downwardly against the gas stream to the liquid bath 78.

From the foregoing, it will be seen that the dust collector 10 includes a new and unique means for removing contaminants from a gaseous medium comprising a converging nozzle wherein a liquid collecting medium is introduced into the gas stream at the mouth of the nozzle by venturi action. The liquid and gas are intimately mixed as they pass from the mouth of the nozzle to the outlet and are accelerated into a high velocity jet or stream for discharge into an expansion area against a similar opposing stream. The jets are enveloped in gaseous liquid envelopes extending outwardly from the outlets of the nozzles and the envelopes of opposing jets directly converge forming a region of intense mixing between opposing nozzle outlets. The contaminants in the gas are wetted by the liquid during mixing in the nozzle flow and in the jet discharged from the nozzle. The wetted contaminants are collected and entrapped in the liquid droplets which are removed from the housing.

The gas leaving the expansion area above the nozzle outlets moves upwardly through a filter bed and entrainment separator wherein more liquid and contaminant particles are removed leaving the gas in a highly purified condition.

While there has been illustrated and described a single embodiment of the apparatus of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. Apparatus for separating contaminants from gas, comprising a housing defining a flow path and having a lower inlet and an upper outlet, wall means dividing said housing between said inlet and outlet and including at least one opening therein, nozzle means joined with and extending upwardly from said wall means having an inlet mouth in communication with said housing inlet through said opening and an upper outlet smaller than said mouth for forming a high velocity gas jet, means for maintaining a liquid bath above said wall means externally of said nozzle means, venturi means for introducing liquid medium from said bath into the gas adjacent the mouth of said nozzle means for wetting and collecting said contaminants, and an expansion chamber in said housing in communication with the outlet of said nozzle means and above said liquid bath for separating the contaminated liquid from said gas, said nozzle means including an upwardly extending portion adjacent said mouth and a curved upper portion adjacent said nozzle outlet for directing said gas stream in a horizontal direction through said nozzle outlet above said liquid bath.

2. The apparatus as defined in claim 1 wherein said venturi means includes port means defined in said nozzle means adjacent the mouth thereof and pressure responsive valve means cooperating with said port means to control the flow of liquid into the gas stream.

3. Apparatus for separating contaminants from gas, comprising a housing defining a flow path and having an inlet and an outlet wall means dividing said housing between said inlet and outlet for holding a bath of contaminant collecting liquid medium having a selected upper level, said wall means having a pair of spaced apart openings therein, a pair of gas nozzle structures extending upwardly from the respective openings in said wall means for directing said contaminated gas in high velocity streams, each of said nozzle structures including a pair of spaced, facing nozzle walls and each having an inlet mouth in communication with said housing inlet through one of said openings and an upper nozzle outlet, each pair of nozzle walls gradually converging to a minimum spacing therebetween adjacent the nozzle outlet, said spaced apart nozzle structures each including a portion adjacent the outlet thereof curved toward the other nozzle structure and formed by said spaced nozzle walls with the nozzle outlet directed to discharge gas into the discharged gas stream from the other nozzle structure intermediate said structures, and port means in said nozzle walls adjacent the mouths of said nozzle structures for introducing said liquid medium from said bath into said gas streams flowing therein.

4. Apparatus for separating contaminants from gaseous fluid, comprising a housing defining a flow path and having an inlet and an outlet, wall means across said housing for dividing said housing between said inlet and outlet, nozzle means extending through said wall means, said nozzle means including a nozzle mouth in communication with the inlet of said housing and a nozzle outlet in communication with the outlet of said housing, said nozzle means also including a pair of opposite walls forming a base portion thereof adjacent said nozzle mouth and gradually converging toward one another to a minimum spacing at said nozzle outlet for accelerating said gas to a maximum velocity, said nozzle walls adjacent said nozzle outlet positioned to direct said gas flowing therein in a horizontal direction, means for maintaining a liquid bath of contaminant collecting liquid medium above said wall means externally of said nozzle means, port means in the base portion of said nozzle walls in communication with the liquid medium in said bath for introducing a flow of contaminant collecting liquid medium into the gas flow in said base portion by venturi action, and valve means cooperating with said port means to prevent the flow of gas through said port means while permitting liquid flow into the base portion of said nozzle means.

5. The apparatus of claim 4 wherein said base portion extends generally upwardly through said liquid bath and includes an upper portion formed by said converging nozzle walls and curved to direct the high velocity gas stream flowing through said nozzle outlet in a generally horizontal direction above said liquid bath.

6. The apparatus of claim 5 wherein one of said nozzle walls forming said upper portion is curved on a radius shorter than the curvature radius of the other nozzle wall.

7. A method of purifying gas, comprising the steps of dividing said gas to flow in a pair of separate gas streams, accelerating said separate gas streams into high velocity gas jets, entraining a contaminate collecting liquid medium in said accelerating gas to wet and collect any contaminants therein in said liquid, discharging said high velocity gas jets into an expansion area for reducing the velocity thereof and directing said discharging gas jets in converging directions to directly intersect and impinge upon one another whereby the contaminated liquid medium separates from the gas.

8. The method of claim 7 wherein said liquid medium is entrained into said gas streams by venturi action and said gas is thereafter accelerated to maximum velocity.

References Cited

UNITED STATES PATENTS

| | | | |
|---|---|---|---|
| 698,953 | 4/1902 | Honts | 261—124 |
| 1,741,519 | 12/1929 | Huff | 261—116X |
| 2,649,924 | 8/1953 | McIlvaine et al. | 55—227 |
| 2,968,164 | 1/1961 | Hanson | 261—115 X |
| 3,080,155 | 3/1963 | Glitsch et al. | 261—114 |
| 3,130,024 | 4/1964 | Vaughan | 55—227 |
| 3,199,267 | 8/1965 | Hausberg | 55—257 X |
| 3,225,522 | 12/1965 | Black | 55—223 |
| 3,233,881 | 2/1966 | Smith | 261—114 X |

FOREIGN PATENTS

| | | |
|---|---|---|
| 885,116 | 5/1943 | France. |

REUBEN FRIEDMAN, *Primary Examiner.*

J. ADEE, *Assistant Examiner.*